April 5, 1938. C. G. HOOVER 2,113,066
PNEUMATIC TIRE
Filed March 10, 1936
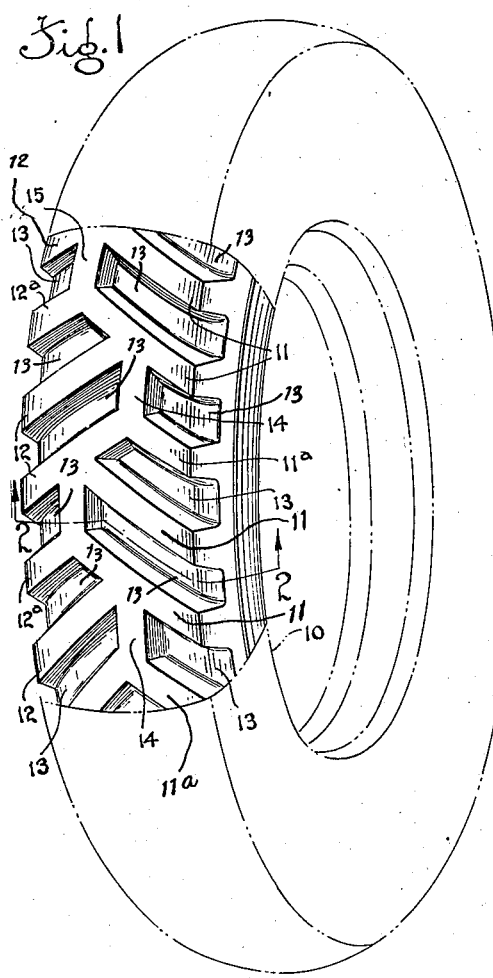
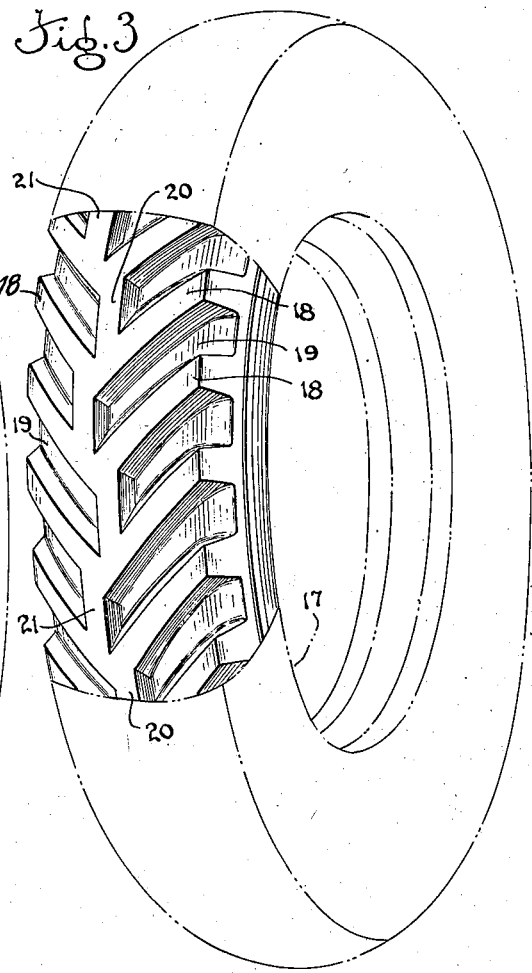
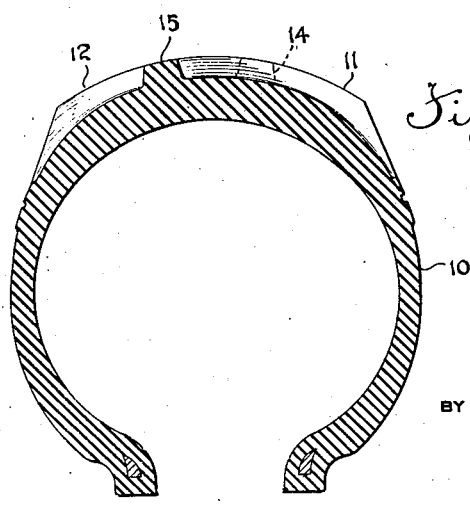
INVENTOR
Clair G. Hoover
BY
ATTORNEY Patented Apr. 5, 1938

2,113,066

UNITED STATES PATENT OFFICE 2,113,066

PNEUMATIC TIRE

Clair G. Hoover, Akron, Ohio, assignor to The Firestone Tire & Rubber Company, Akron, Ohio, a corporation of Ohio Application March 10, 1936, Serial No. 68,033

5 Claims. (Cl. 152—14)

This invention relates to pneumatic tires, and more especially it relates to the configuration of the tread portion of pneumatic tire casings.

In some of its aspects the invention constitutes an improvement over the inventions of my prior Patent No. 2,011,552, issued August 13, 1935, and the patent to Albert Hargraves, Patent No. 1,996,418, issued April 2, 1935.

The chief object of the invention is to provide a tire tread that will have greater resistance to side slip or lateral skidding than the tires of the patents aforesaid, without material sacrifice of the other advantages inherent in said tires. Other objects will be manifest.

Of the accompanying drawing,

Figure 1 is a fragmentary perspective view of a tire embodying the invention, in its preferred form;

Figure 2 is a section on the line 2—2 of Figure 1; and

Figure 3 is a fragmentary perspective view of another embodiment of the invention.

Referring to Figures 1 and 2 of the drawing, 10 is a pneumatic tire casing of any known or preferred structural characteristics. The tread portion of the tire 10 is formed with a circumferential series of obliquely disposed ribs or bars 11, 11ª, the outer ends of which are disposed at one lateral margin of the tire tread, and a similar series of obliquely disposed ribs or bars 12, 12ª, the outer ends of which are disposed at the other lateral margin of the tread. It will be observed from reference to Figure 1 that the ribs 11ª, 12ª are shorter than the ribs 11, 12 respectively, and that the ribs are arranged about the tire in a sequence consisting of a short rib followed by two long ribs. The tread-ribs define intervening spaces or grooves 13, 13, each of which is obliquely disposed with relation to the periphery of the tire, and extends from the medial portion of the tread to one of the lateral margins thereof. There are no completely enclosed grooves in the tread, and said grooves preferably are of greater width than the ribs at each side thereof. It will be observed further that all of the said ribs on either side of the tread terminate at the lateral margin of the tread in transverse alignment with a groove 13 on the opposite side of the tread.

The angularity of the ribs 11, 11ª, 12, 12ª is such that the ribs on one side of the tread intersect those on the opposite side of the tread at an angle somewhere in the medial region of the tread. The ribs are so arranged that short ribs 11ª, 12ª join end to end with respective long ribs 12 and 11, and the other long ribs 11, 12 intersect the aforementioned ribs 12 and 11 at intermediate regions of their length.

In addition to the obliquely disposed ribs aforementioned, the improved tread comprises short ribs 14, 15 that are disposed parallel to the plane of the tire, and are arranged in two circumferential series disposed on opposite sides of the central plane of the tread. Each rib 14 extends from the exterior angle formed by the intersection of ribs 11ª, 12, across one groove 13, and intersects the adjacent rib 11 at the juncture of the latter with a rib 12. In like manner each rib 15 extends from the exterior angle formed at the intersection of ribs 12ª, 11, across one groove 13, and intersects the adjacent rib 12 at the juncture of the latter with a rib 11.

The ribs 14, 15 constitute, in effect, parallel, interrupted circumferential ribs, there being two grooves 13 between the ends of each rib 14 and each rib 15. The ribs 14 and 15 are staggered with relation to each other, whereby a symmetrical structure is produced.

The provision of the circumferentially arranged ribs 14, 15 assures improved resistance to lateral skidding in tires of this general design. Said ribs also eliminate each exposed point or arris at the exterior angles of intersecting long and short ribs, which points otherwise would be subjected to wiping action during use, with consequent excessive wear.

Referring now to the embodiment of the invention shown in Figure 3, 17 denotes a pneumatic tire casing, the tread portion of which is formed with a circumferential series of symmetrical, V-shaped figures or chevrons 18, 18. All the V-shaped figures 18 lie in the same direction, and have their outer ends disposed at the respective lateral margins of the tread. The figures are circumferentially spaced from each other so as to define intervening grooves 19, which grooves preferably are of greater width than the ribs that constitute the said figures.

This tread also includes two circumferential series of short ribs 20, 21 that are disposed parallel to the plane of the tire and on opposite sides of the centerline of the tread, one margin of each rib 20, 21 being on said centerline. The length of each rib 20, 21 is such that it extends across one groove 19 and joins adjacent chevrons 18. The ribs 20, 21 are staggered with relation to each other, the arrangement being such that alternate grooves 19 are traversed by ribs 20, and the intermediate grooves are traversed by ribs 21. The feature of positioning the ribs 20, 21 with one margin on the centerline of the treads eliminates the arris or apex at the juncture of the two angularly disposed ribs forming each of the V-shaped figures 18, and consequently eliminates the excessive wear which otherwise would occur at these points due to "wiping action" during use.

In both embodiments of the invention the continuous central "riding strip" or rib has been eliminated and in its place has been provided a pair of discontinuous circumferential ribs disposed at each side of the centerline of the tread. Thus the tendency of the tire to slip laterally is greatly reduced, and superior means is provided for checking such slipping. By having the circumferential ribs adjoin the V-shaped formations at the angles thereof, the presence of angular or "dog-leg" grooves between adjacent formations is avoided. Thus every groove is straight, from its inner end to the side of the tread, and there are no recesses or pockets such as would retain mud and thus reduce the tractive effort of the tires.

Other modification may be resorted to without departing from the spirit of the invention or the scope of the appended claims.

What is claimed is:

1. A pneumatic tire having a tread portion comprising sets of parallel ribs upon opposite sides of the tread and disposed in opposite oblique relation to the center line of the tread to form a succession of V-shaped formations about the tire, and two, parallel circumferential series of short ribs disposed parallel to the center line of the tread on opposite sides thereof and connecting successive V-shaped formations, the units of one of said series being staggered with relation to the units of the other series, and the grooves between adjacent ribs being straight and non-angular.

2. A pneumatic tire having a tread portion comprising sets of parallel ribs upon opposite sides of the tread and disposed in oblique relation to the center line of the tread to form a succession of V-shaped formations about the tread, the angles of the formations being alternated on opposite sides of the center line of the tire, and two, parallel, circumferential series of short ribs disposed parallel to the center line of the tread and connecting successive V-shaped formations, said short ribs extending from the exterior angle or arris of the formations whereby wiping action upon said arris is avoided.

3. A pneumatic tire having a tread portion comprising sets of parallel ribs upon opposite sides of the tread and disposed in opposite oblique relation to the center line of the tread to form a succession of V-shaped formations about the tire, said formations being symmetrically arranged with their angles lying along the centerline of the tread, and two parallel rows of longitudinally spaced ribs disposed parallel to the centerline of the tread and on opposite sides thereof, the said ribs alternately connecting adjacent V-shaped formations, and the grooves defined by adjacent ribs being straight and non-angular.

4. A combination as defined in claim 3 in which one lateral margin of each of the two rows of circumferentially extending ribs lies on the center line of the tread whereby the arris or apex of each V-shaped formation is eliminated.

5. A pneumatic tire tread having a portion comprising parallel ribs arranged in a plurality of circumferential series on opposite sides of the centerline and positioned in opposite diagonal relation thereto, at least one rib of each series being of greater length than another rib of the same series, and all of the grooves defined by adjacent ribs being straight and non-angular.

CLAIR G. HOOVER.